United States Patent Office 3,470,230
Patented Sept. 30, 1969

3,470,230
PROCESS FOR PREPARING VINYL COMPOUNDS
Lothar Hirsch, Kelkheim, Taunus, and Lothar Hörnig, Günther Mau, and Therese Quadflieg, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 23, 1965, Ser. No. 442,208
Claims priority, application Germany, Apr. 16, 1964,
F 42,628
Int. Cl. C07c 121/30
U.S. Cl. 260—465.3                        6 Claims

ABSTRACT OF THE DISCLOSURE

A process for the vinylation of a nucleophilic compound having a hydrogen atom that is easily split off wherein a vinyl group is added in place of said hydrogen atom, which process comprises reacting ethylene, oxygen and a nucleophilic compound of the type mention in the presence of palladous oxide catalyst, one example being the reaction of ethylene, oxygen and HCN at temperatures of, for example, 20° C. to 350° C.

---

The present invention relates to a process for preparing vinyl compounds from ethylene, oxygen and nucleophilic compounds using as catalyst palladous oxide.

It is known that ethylene can be reacted with acetic acid in the presence of palladous chloride and sodium acetate to yield vinyl acetate. In a process carried out in continuous manner an oxygen-transferring redox system (for example copper chloride or benzoquinone) and oxygen are simultaneously added to oxidize the palladium formed by reduction of palladous chloride.

When ethyl alcohol is used instead of acetic acid diethyl acetal is obtained.

It is likewise known that organic acetates can be produced by reacting olefins with oxygen and acetic acid in the presence of noble metals, especially palladium. Vinyl acetate can be produced, for example, from ethylene, oxygen and acetic acid in the presence of palladium. When propylene is used, a mixture of allyl acetate and acetone is obtained.

It has now been found that vinyl compounds can be prepared by reacting ethylene, oxygen and nucleophilic compounds, the latter having at least one hydrogen atom that is easy to split off, on solid palladous oxide catalyst.

When the nucleophilic compound having at least one hydrogen atom that is easy to split off is designated as HX, the reaction can be formulated as follows:

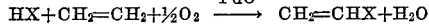

$$HX + CH_2=CH_2 + \tfrac{1}{2}O_2 \xrightarrow{PdO} CH_2=CHX + H_2O$$

Nucleophilic compounds HX in the sense of the present invention having one and possibly several hydrogen atoms that are easy to split off, are compounds which belong to different classes of substances of inorganic and organic chemistry.

There are mentioned inorganic acids free of oxygen, such as hydrogen halides, for example hydrogen fluoride, hydrogen chloride or hydrogen bromide. Hydrogen chloride and also hydrogen cyanide are preferred from the group of inorganic, oxygen-free acids. The use of hydrogen chloride leads to the formation of vinyl chloride while hydrogen cyanide gives vinyl cyanide. It is likewise suitable, for example, to use cyanic acid.

Organic nucleophilic compounds in the sense of the invention are especially those in which an oxygen atom, a sulfur atom or a nitrogen atom simultaneously carries at least one hydrogen atom and a free pair of electrons.

There may be used, for example, carboxylic acids, alcohols, phenols, mercaptans, thiophenols, primary and secondary amines and carboxylic acid amides or imides. From among the carboxylic acids, alkanoic acids are preferred, especially those having 2 to 4 carbon atoms such as acetic acid, propionic acid, butyric acid, and isobutyric acid. According to the process of the invention vinyl acetate is obtained from acetic acid and vinyl-isobutyrate is obtained from isobutyric acid. It is likewise possible, however, to use formic acid, acrylic acid, carboxylic acids having more than 4 carbon atoms, for example hexanoic acid and cyclohexanoic acid, and liquid carboxylic acids with still longer chains, such as oleic acid, or when used in the form of solutions, solid carboxylic acids such as lauric acid, palmitic acid and stearic acid.

Suitable alcohols are alkanols, especially those with 1 to 4 carbon atoms, such as methanol, ethanol, isopropanol and tert. butanol, as well as cycloalkanols such as cyclohexanol, and aralkyl alcohols such as benzyl alcohol. When the aforesaid alcohols are used in the reaction, the corresponding vinyl ethers are obtained, in the case of ethanol, for example vinyl ethyl ether.

Phenols that can be used, are, for example, phenol and cresols. Suitable thiols are mercaptans such as methyl-, ethyl-, and propyl-mercaptan as well as thiophenols.

The amines that can be used in the process of the invention may belong to the series of primary or secondary amines and they may be of aliphatic, cycloaliphatic, araliphatic or aromatic nature. Secondary amines may also belong to the heterocyclic series.

In detail, there are mentioned as primary amines: methylamine, ethylamine, isopropylamine, n-butylamine, t.-butylamine, hexylamine, oleylamine, cyclohexylamine, methylcyclohexylamine, benzylamine, aniline, ortho-, meta- and para-toluidines and the various xylidines;

As secondary amines: dimethylamine, diethylamine, methylethylamine, methylbutylamine, methylhexadecylamine, didodecylamine, dicyclohexylamine, methylbenzylamine, methylaniline, ortho-, meta- and para-methyl-toluidines;

As heterocyclic amines: pyrrolidine, piperidine, tetrahydro-isoquinoline, carbazole.

Suitable carboxylic acid amides, which may have an acylic or a cyclic structure, are, for example, acetamide, n-methyl-acetamide, ε-aminocaprolactam, pyrrolidone and phthalimide.

By the reaction according to the invention the amines and carboxylic acid amides are transformed into vinylated amines or vinylated carboxylic acid amides.

In the formula HX given above for the nucleophilic starting compounds X may consequently represent, inter alai, halogen, the cyano group —CN, the acyloxy group —OCOR, the ether group —OR as well as the amino groups —NHR or NRR$_1$, in which in all cases R and R$_1$ may stand for an alkyl, cycloalkyl, aralkyl or aryl group—if an aryl group is present this being preferably a phenyl group or a phenyl group carrying low molecular weight alkyl groups—and in which R and R$_1$ as alkyl groups in the case of secondary amines may be linked, preferably to form a five- or six-numbered heterocyclic ring in which the amine nitrogen atom mostly represents the sole heteroatom.

Naturally, there may also be used those organic compounds which carry two or several of the aforesaid groupings. Thus it is possible, for example, to use dicarboxylic acids, for example succinic acid or adipic acid, or diols, especially diols having 2 to 6 carbon atoms, such as ethylene glycol, propylene glycol and hexylene glycol, and also glycerol and finally diamines having two primary or two secondary amino groups or one primary and one secondary amino group, for example ethylenediamine, N,N'-dimethyl-diaminoethane, N-ethylethylenediamine and piperazine.

Still further, it is possible to use compounds with different of the aforesaid functional groups, for example aminocarboxylic acids such as glycocoll, aminoalcohols, such as aminoethanol; hydroxycarboxylic acids, such as lactic acid, tartaric acid and p-hydroxyphenylacetic acid.

As catalyst palladous oxide is used. It may be used alone, but suitably applied to an inert carrier. As carrier materials there are especially suitable those having a large surface, for example aluminium oxide, aluminium silicate, silica gel, zeolites, feldspars, pumice, clays or molecular sieves.

The system catalyst/carrier can be prepared in various ways. The carrier can be impregnated with the solution of a palladium salt, suitably palladous nitrate, and the palladous oxide can be formed by slowly heating the impregnated carrier in the presence of air to a temperature in the range of from 500° C. to 1000° C. Still further, the system consisting of catalyst and carrier can be prepared by impregnating the carrier with the solution of a palladium salt, advantageously palladous chloride, reducing the palladous chloride with hydrogen at a temperature in the range of from 80° C. to 200° C. to elementary palladium, washing out the chloride ions with water and transforming the elementary palladium into palladous oxide in an oxygen current at a temperature ranging from 750° C. to 820° C. Although the latter mode of preparation of the catalyst is more complicated, it generally results in a more uniform and finer distribution of the palladous oxide on the carrier.

The palladous oxide (PdO) can be detected in simple manner on the carrier prior to, during and after the reaction by dissolving tests in nitric acid and hydrochloric acid. It is known that elementary palladium is soluble in nitric acid, while palladium salts are soluble in hydrochloric acid. Palladous oxide is attacked by neither of the acids.

The activity of the catalyst depends, in the first place, on its mode of preparation, and, in the second place, on the concentration of the palladous oxide on the carrier material. It is advantageous to use catalysts containing 1 to 40, and preferably 2 to 20% by weight of palladous oxide, calculated on the total weight of palladous oxide and carrier material. It is possible, however, to obtain vinyl compounds with a concentration of palladous oxide below 1 and above 40% by weight. Concentrations of palladous oxide of more than 20% are not always advantageous because in this case the palladous oxide may be present in a coarser, less active distribution on the carrier material.

In general, the reaction according to the invention is carried out in a manner such that the starting materials ethylene, oxygen, and the nucleophilic compound are conducted over the catalyst, suitably in admixture with one another. When the nucleophilic compound is gaseous or vaporous under the reaction conditions, the reaction is a pure gas-phase or vapor-phase reaction. When, however, the nucleophilic compound is liquid under the reaction conditions or used in the form of a solution in a reaction-inert solvent, the mixture of ethylene and oxygen, on the one hand, and the liquid nucleophilic compound, on the other, are conducted in co-current or counter-current flow over the stationary catalyst, this being a mixed-phase reaction. It is likewise possible to introduce the liquid nucleophilic compound, which may be diluted with a reaction-inert diluent, into the reaction vessel, to suspend the catalyst in the said liquid either in free form or together with a carrier material and to introduce into the suspension the mixture of ethylene and oxygen. In this case the reaction takes place in the liquid phase.

When the reaction is not carried out in the liquid phase, it is often advantageous to conduct ethylene, oxygen and the gaseous or liquid nucleophilic compound through a reaction tube filled with the catalyst. With the use of liquid substances it may be of advantage to use a column filled with the catalyst, in which the fresh gases are conducted in co-current or counter-current flow.

The gaseous starting materials may also be used in admixture with other reaction-inert gases, for example low molecular weight hydrocarbons such as ethane, furthermore nitrogen, noble gases, carbon dioxide and the like. The oxygen required for oxidation can be used in the form of air.

Liquid substances which shall be vinylated can be subjected to the vinylation reaction according to the invention in admixture with reaction-inert solvents. Suitable nonaqueous solvents are, for example, ketones such as acetone, methylethyl ketone and cyclohexanone; cyclic ethers such as tetrahydrofurane and dioxane; chlorinated hydrocarbons such as chloroform and carbon tetrachloride, saturated aliphatic hydrocarbons such as hexane and gasoline mixtures and, for example, benzene. Although the reaction is generally carried out in the absence of water, small amounts of water do not disturb. It is thus possible to use the nucleophilic compounds and the aforesaid solvents also in moist form. Moreover, in the mixture of the used gaseous or vaporous starting compounds small amounts of steam may be present.

Compounds which are known to promote the known vinylation reaction using acetylene as vinylating agent may be added to the catalyst or the liquid compounds to be vinylated. Substances of this type are, for example, compounds of the elements of the second subgroup of the Periodic Table, such as compounds of zinc, cadmium and mercury.

In the process according to the invention no critical temperature and pressure limits are to be maintained. In order to obtain high conversions it is of advantage to operate at high temperature and under elevated pressure. However, if the temperatures and pressures applied are too high the formation of undesired by-products is promoted, above all the formation of ethyl compounds analogous to the vinyl compounds, and oxidation products are formed. It is therefore suitable to carry out the reaction according to the invention at a temperature in the range of from 20° C. to 350° C., advantageously 50° C. and 250° C. and under a pressure in the range of from 0.2 to 20 atmospheres, preferably 1 and 10 atmospheres. As already mentioned above, a vinylation according to the invention also takes place under temperature and pressure conditions outside of the aforesaid limits.

The reaction products obtained can be further processed in known manner according to various methods. In general, the reaction is not quantitative. A mixture is obtained consisting of the desired vinyl compound with the unreacted starting compounds. The best method for separating the mixture obtained depends, in the first place, on the boiling points of the vinyl compound obtained and of the nucleophilic compound used. The mixtures may be separated, for example, by distillation, freezing out, extraction or other known measures. The unreacted starting compounds, which have been separated from the vinyl compound, are suitably reconducted into the reaction zone and again subjected to reaction.

It also depends on the differences between the boiling points, particularly the boiling points of the nucleophilic starting compound to be vinylated and the final products containing vinyl groups whether the reaction is advantageously carried out in the liquid phase or in the gaseous phase. When vinyl chloride or acrylonitrile are to be prepared according to the process of the invention it is of advantage, for example, to use gaseous hydrogen chloride or gaseous hydrogen cyanide because in either case the vinylated compounds contained in the mixture leaving the reaction zone have the highest boiling points so that they are easy to separate. It is not the same, for example, in the vinylation of acetic acid or n-butanol. These compounds are preferably used in the form of a liquid. The reaction mixture obtained is then cooled or heated until the vinyl compound escapes as gas and the unreacted portion of the starting compounds remains behind as a liquid. In this case, the vinyl compound may be isolated in a series-connected cooling system by condensation.

The decision whether gaseous or liquid substances are to be used depends, of course, also on other features, for example on the question of safety since the mixtures of reactants and of the reaction mixtures may be explosive or combustible owing to the simultaneous presence of oxygen and organic compounds.

It furthermore depends on the limits of explosion and the necessity to operate outside of the said limits whether the three starting compounds can be used in stoichiometric amounts. In general, however, a deficiency or an excess of oxygen is used. The molar amounts of ethylene and the compound to be vinylated, HX, should not be too different. When the process according to the invention is carried out on an industrial scale, the molar ratios are in the range of from about 1:5 to 5:1 and advantageously 1:3 and 3:1.

As compared with the known process of vinylating nucleophilic compounds with ethylene in the presence of palladium chloride, the process according to the invention offers the advantage that it is possible to perform the reaction in continuous manner in the absence of redox systems because the catalyst is not reduced to metallic palladium and, hence, an oxidative regeneration is not required. Consequently, the reaction solutions are free from ions originating from a redox system, for example copper and chloride ions, so that the formation of chlorine-containing by-products is suppressed.

In the special case of the preparation of acetates of unsaturated alcohols according to the known process by reacting ethylene and oxygen with liquid acetic acid in the presence of metallic palladium, the observation is made that elementary palladium is dissolved on the carrier by liquid acetic acid in the presence of oxygen and with the formation of palladous compounds. In contradistinction thereto, the catalyst containing palladous oxide according to the invention remains unchanged since PdO is insoluble in acids, even in the presence of oxygen.

The following examples serve to illustrate the invention but they are not intended to limit it thereto.

Example 1

500 milliliters (bulk volume) of aluminium silicate (bentonite) in the form of balls having a diameter of 5 millimeters and a solution of 50 grams of palladous chloride (corresponding to 30 grams of palladium) in aqueous hydrochloric acid were heated in a rotary evaporator until the mixture was dry. The mixture obtained was then treated with hydrogen at 100° C., whereby the palladous chloride was reduced to metallic palladium. After washing with water and drying, the palladium was oxidized at 800° C. by means of oxygen to the oxide PdO. The catalyst thus obtained was transferred into a heatable reactor having a diameter of 25 mm. and a length of 1,000 mm. At a reaction temperature of 130° C. and atmospheric pressure at the upper end of the reactor 50 grams of liquid acetic acid were dropped in per hour which soon evaporated. A gas mixture of 30 N liters of ethylene and 7.5 N liters of oxygen (N=measured under normal conditions of pressure and temperature) was likewise introduced. The mixture leaving the reactor at the lower end was cooled. The condensate obtained contained 6.4% by weight of vinyl acetate besides acetic acid.

Example 2

500 milliliters of aluminum oxide in the form of balls having a diameter of 6–7 mm. were impregnated as described in Example 1 with the same amount of palladous chloride and further treated. In the same reactor as used in Example 1 there were introduced per hour at atmospheric pressure and a temperature of 90° C. 50 grams of liquid isobutyric acid and 50 N liters of a gas mixture composed of 65% by volume of ethylene, 15% by volume of oxygen, 10% by volume of nitrogen and 10% by volume of carbon dioxide. The mixture of gas and liquid leaving the reactor at the lower end was cooled and separated. The liquid contained, in addition to isobutyric acid, 3.9% by weight of vinylisobutyrate, 0.6% by weight of acetone and 0.2% by weight of acetaldehyde.

Example 3

200 milliliters of feldspar having a medium grain size of 5 mm. were impregnated with 25 grams of palladous nitrate (corresponding to 10 grams of Pd) and the material was treated at 500° C. in an air current, whereby nitrous gases escaped. The palladium oxide catalyst obtained was transferred into a U-shaped, pressure resistant glass tube having a diameter of 20 mm. which was heated by means of an oil bath. Under a pressure of 2.2 atmospheres and at 170° C., 66 N liters of a mixture of 60% by volume of ethylene, 15% by volume of oxygen and 25% by volume of hydrogen chloride were passed per hour over the catalyst. After having left the reaction tube, the gas was conducted through a condenser and the pressure was released. It contained on the average 5.8% by volume of vinyl chloride, 0.6% by volume of ethyl chloride and 0.9% by volume of carbon dioxide in addition to unreacted starting material.

We claim:
1. A process for the vinylation of a nucleophilic compound having a hydrogen atom that is split off wherein a vinyl group is added in place of said hydrogen atom, which process comprises reacting ethylene, oxygen and HCN as said nucleophilic compound in the presence of palladous oxide catalyst.
2. A process for the vinylation of a nucleophilic compound according to claim 1 wherein said process is conducted at a temperature between about 20° C. and about 350° C.
3. A process for the vinylation of a nucleophilic compound according to claim 1 wherein said process is conducted at a pressure between about 0.2 atmosphere and about 20 atmospheres.
4. A process for the vinylation of a nucleophilic compound according to claim 1 wherein from about 0.2 mol to about 5 mols of ethylene are reacted per mol of said HCN.
5. A process for the vinylation of a nucleophilic compound according to claim 1 wherein said palladous oxide catalyst is on a carrier.
6. A process for the vinylation of a nucleophilic compound according to claim 5 wherein said palladous oxide catalyst is used in an amount of from about 1% to about 40% by weight calculated on the total weight of said caalyst and said carrier.

References Cited

UNITED STATES PATENTS 3,227,747  1/1966  Lum et al. _____ 260—497
3,275,680  9/1966  Holzrichter et al. ____ 260—497

JOSEPH P. BRUST, Primary Examiner

U.S. Cl. X.R.

260—268, 283, 293, 315, 326, 326.5, 326.8, 410.9, 468, 473, 478, 484, 485, 486, 497, 561, 563, 570.9, 577, 583, 584, 609, 611, 612, 614, 615, 653.4, 656